Patented Mar. 17, 1936

2,034,247

UNITED STATES PATENT OFFICE 2,034,247

AZO DYESTUFFS

Hans Reindel, Ludwigshafen-on-the-Rhine, and Hans Krzikalla, Mannheim, Germany, assignors to General Aniline Works, Inc., New York, N. Y., a corporation of Delaware No Drawing. Application March 19, 1932, Serial No. 600,058. In Germany March 26, 1931

7 Claims. (Cl. 260—94)

The present invention relates to new azo dyestuffs and process of producing the same.

We have found that azo dyestuffs yielding dyeings of very good fastness to washing and fulling are obtained by diazotizing an amino arylide of an aliphatic acid containing at least 10 carbon atoms and coupling with a naphthol-disulphonic acid having free ortho-positions to the hydroxy group. The said aromatic amines used for diazotization may be prepared by condensing an aromatic compound containing at least two amino groups with an aliphatic monocarboxylic acid halide, for example with the chloride of capric, lauric, myristic, palmitic, margaric and stearic acid, or of unsaturated aliphatic acids, for example oleic, elaïdic and ricinoleic acid or the acids from soya bean oil. As aromatic amines of which the aforesaid acylamino compounds are used for diazotization, preferably those of the benzene and naphthalene series are employed.

The present invention includes also polyazo dyestuffs in which at least one of the diazo components contains an amino group substituted by the radicle of the said aliphatic carboxylic acid.

The influence of the length of the aliphatic radicles combined with the components on the shade of the dyestuffs is slight, but the influence on the fastness to washing is greater, the latter being improved by an increase in the number of carbon atoms. Furthermore, the presence of any double linkages in the aliphatic radicles exerts no very great influence on the shade of the dyestuff.

As coupling components naphthol-disulphonic acid or substitution products thereof having free ortho-positions to the hydroxy group are employed. Substituents which may be present are for example halogen, amino, nitro, carboxylic and sulphonic acid groups. In case an amino group is present it may, after coupling, be diazotized and the resulting diazo azo compound coupled with another component.

The following examples will further illustrate the nature of this invention but the invention is not restricted to these examples. The parts are by weight.

Example 1

7 parts of solid sodium nitrite are dissolved while heating in about 400 parts of concentrated sulphuric acid and after cooling 37.4 parts of para-aminostearic acid anilide are introduced while stirring. When the diazotization is completed, the whole is poured onto ice, the diazo compound filtered off by suction, washed with a little water if necessary and then introduced into an aqueous solution of 35 parts of 2-naphthol-6,8-disulphonic acid and containing an excess of soda. The mixture is stirred for some time until the coupling is completed and then warmed slightly, filtered by suction and dried. The dyestuff is a red powder which is readily soluble in hot water and which dyes wool from an acid bath red orange shades fast to light. The dyeing has an excellent fastness to washing and fulling.

Instead of para-aminostearic acid anilide, para-aminopalmitic acid anilide may be employed, and this yields a very similar dyestuff with the same coupling component.

Example 2

37.2 parts of para-aminooleic acid anilide are dissolved while hot in glacial acetic or formic acid and diazotized in the cold with 20 parts of an aqueous nitrite solution containing 7 parts of sodium nitrite while adding hydrochloric acid. The diazo solution is allowed to run into a cold solution of about 35 parts of 1-naphthol-3,6-disulphonic acid sodium salt which is rendered sufficiently alkaline by means of soda. The coupling is completed rapidly; the mixture is then heated, the precipitate filtered by suction and dried. A dyestuff is obtained which is readily soluble in water and which dyes wool beautiful red shades fast to washing and fulling.

Instead of para-aminooleic acid anilide, the corresponding monoacidyl compounds prepared from oleic acid or its chloride and meta-phenylene- or meta-toluylene-diamine may be employed as diazo components and these yield similar dyestuffs having similar properties as regards fastness.

Other coupling components which may be used instead of 1-naphthol-3,6-disulphonic acid are for example 1,8-amino-naphthol-3,6-disulphonic acid or its acetyl compound, 1-naphthol-4,8-disulphonic acid and 1,8-dihydroxynaphthalene-3,6-disulphonic acid, and these yield different shades of colour according to the substituents but are all distinguished by an excellent fastness to washing.

Example 3

38.2 parts of para-aminoricinoleic acid anilide are diazotized as described in Example 2 and introduced into a solution of 37 parts of 1,8-aminonaphthol-4,6-disulphonic acid which has been rendered alkaline with soda. A dyestuff readily soluble in water is obtained which dyes wool fast blue red shades. The dyestuff may also be employed for dyeing other materials, as for example leather.

In the case of naphthol disulphonic acids which, like aminonaphthol- or dihydroxynaphthalene disulphonic acids, may be coupled twice, the monoazo dyestuffs may also be employed for coupling with the diazo compounds containing the fatty acid radicle. Thus for example the monoazo dyestuff prepared in acid solution from para-nitraniline and 1,8-aminonaphthol-3,6-disulphonic acid may be coupled with the diazo compound prepared as hereinbefore described whereby a very fast blue dyestuff is obtained.

*Example 4*

30.4 parts of meta-aminolauric acid toluidide are diazotized as described in Example 2 and introduced into a solution of 42.2 parts of 1-benzoylamino-8-naphthol-3,6-disulphonic acid containing an excess of soda. A dyestuff yielding fast bluish red dyeings is obtained.

What we claim is:—

1. Azo dyestuffs corresponding to the general formula:

(SO₃H)₂—R'—N=N—R—NH—CO—X in which R stands for a radicle of the benzene or naphthalene series, X stands for an aliphatic radicle having at least 9 carbon atoms and R' for the radicle of a naphthol having free ortho-positions to the hydroxy group.

2. Azo dyestuffs corresponding to the general formula:

(SO₃H)₂—R'—N=N—R—NH—CO—X in which R stands for a benzene radicle, X stands for an aliphatic radicle having at least 9 carbon atoms and R' for the radicle of a naphthol having free ortho-positions to the hydroxy group.

3. Azo dyestuffs corresponding to the general formula:

(SO₃H)₂—R'—N=N—R—NH—CO—C₁₇H₃₅ in which R stands for a benzene radicle and R' for the radicle of a naphthol having free ortho-positions to the hydroxy group.

4. Azo dyestuffs corresponding to the general formula:

(SO₃H)₂—R'—N=N—R—NH—CO—C₁₇H₃₃ in which R stands for a benzene radicle and R' for the radicle of a naphthol having free ortho-positions to the hydroxy group.

5. Azo dyestuffs corresponding to the general formula:

(SO₃H)₂—R'—N=N—R—NH—CO—C₁₅H₃₁ in which R stands for a benzene radicle and R' for the radicle of a naphthol having free ortho-positions to the hydroxy group.

6. Azo dyestuff corresponding to the formula:

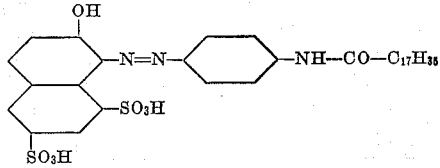

dyeing wool from an acid bath red orange shades of good fastness to washing and fulling.

7. Azo dyestuffs corresponding to the formula:

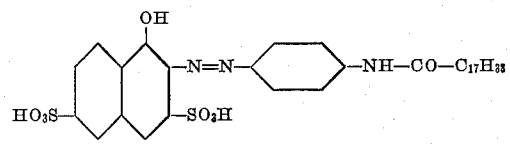

dyeing wool from an acid bath red shades of good fastness to washing and fulling.

HANS REINDEL.
HANS KRZIKALLA.